US012502715B2

(12) United States Patent
Vernet et al.

(10) Patent No.: US 12,502,715 B2
(45) Date of Patent: Dec. 23, 2025

(54) METHOD FOR DETECTING DEFECTS IN AN ADDITIVE MANUFACTURING POWDER LAYER DEPOSITED ON A WORKING AREA

(71) Applicant: AddUp, Cebazat (FR)

(72) Inventors: Raphael Vernet, Cebazat (FR); Pascal Belaubre, Cebazat (FR); Sebastien Devroe, Cebazat (FR)

(73) Assignee: ADDUP, Cebazat (FR)

( * ) Notice: Subject to any disclaimer, the term of this patent is extended or adjusted under 35 U.S.C. 154(b) by 349 days.

(21) Appl. No.: 18/017,154

(22) PCT Filed: Jul. 22, 2021

(86) PCT No.: PCT/FR2021/051368
§ 371 (c)(1),
(2) Date: Jan. 20, 2023

(87) PCT Pub. No.: WO2022/018382
PCT Pub. Date: Jan. 27, 2022

(65) Prior Publication Data
US 2023/0264268 A1 Aug. 24, 2023

(30) Foreign Application Priority Data
Jul. 22, 2020 (FR) ..................................... 2007677

(51) Int. Cl.
*B22F 12/90* (2021.01)
*B22F 10/28* (2021.01)
(Continued)

(52) U.S. Cl.
CPC .............. *B22F 12/90* (2021.01); *B22F 10/28* (2021.01); *B22F 10/80* (2021.01); *B33Y 10/00* (2014.12); *B33Y 30/00* (2014.12); *B33Y 50/00* (2014.12)

(58) Field of Classification Search
None
See application file for complete search history.

(56) References Cited

U.S. PATENT DOCUMENTS 10,353,376 B2 7/2019 Huang et al.
10,719,929 B2 7/2020 Craeghs et al.
(Continued)

FOREIGN PATENT DOCUMENTS

CN 110253019 A 9/2019
DE 102018207405 A1 11/2019
(Continued)

OTHER PUBLICATIONS

International Search Report dated Oct. 7, 2021, in corresponding PCT/FR2021/051368 (5 pages).
(Continued)

*Primary Examiner* — Anthony M Liang
(74) *Attorney, Agent, or Firm* — VENABLE LLP

(57) ABSTRACT

A method for detecting defects in a layer of additive manufacturing powder deposited on a work zone, comprises the steps of: i. acquiring an image of a layer of additive manufacturing powder, ii. determining a discrete spectral representation of the image acquired, iii. filtering the discrete spectral representation of the image acquired in frequency terms, iv. determining a filtered image from the filtered discrete spectral representation of the image acquired, and v. analyzing the filtered image so as to detect defects.

11 Claims, 5 Drawing Sheets

(51) Int. Cl.
  *B22F 10/80* (2021.01)
  *B33Y 10/00* (2015.01)
  *B33Y 30/00* (2015.01)
  *B33Y 50/00* (2015.01)

(56) References Cited

U.S. PATENT DOCUMENTS

| | | |
|---|---|---|
| 2016/0224017 A1 | 8/2016 | Huang et al. |
| 2018/0322621 A1 | 11/2018 | Craeghs et al. |
| 2021/0331399 A1 | 10/2021 | Seita et al. |
| 2023/0234133 A1 | 7/2023 | Anneton et al. |
| 2023/0234134 A1 | 7/2023 | Anneton et al. |

FOREIGN PATENT DOCUMENTS

| | | |
|---|---|---|
| EP | 3378039 A1 | 9/2018 |
| JP | 8-45999 A | 2/1996 |
| JP | 2020-506094 A | 2/2020 |
| WO | 2016/123549 A1 | 8/2016 |
| WO | 2020/046212 A1 | 3/2020 |
| WO | 2020/100056 A1 | 5/2020 |

OTHER PUBLICATIONS

W. Fu-liang et al., "Detection of surface cutting defect on magnet using Fourier image reconstruction", J. Cent. South Univ. (2016) 23: 1123-1131.

METHOD FOR DETECTING DEFECTS IN AN ADDITIVE MANUFACTURING POWDER LAYER DEPOSITED ON A WORKING AREA

GENERAL TECHNICAL FIELD

The present invention relates to the field of additive manufacturing and more specifically of selectively additively manufacturing a three-dimensional object from layers of powder. In particular, the invention proposes a method which makes it possible to detect defects in the layers of powder before they are selectively consolidated.

PRIOR ART

Selective additive manufacturing consists in making three-dimensional objects by consolidating selected zones in successive strata of powdered material (metallic powder, ceramic powder). The consolidated zones correspond to successive cross sections of the three-dimensional object. Consolidation is performed, layer by layer, by total or partial selective melting performed with a focused source of radiation, such as an optical source (high-power laser, for example) or else a particle beam source (for example, a beam of electrons—the technology known as EBM or "Electron Beam Melting" according to the terminology generally used in the field).

The methods for selectively additively manufacturing a three-dimensional object from layers of powder make it possible to manufacture parts combining precision and surface quality, with levels of detail of the order of around ten micrometres. However, this precision and this surface quality may be greatly degraded if the layers of powder have deposit defects (untimely deposits, lack of powder (for example "cat's tongues") or else ripples due to poor spreading of the powder by the roller or the scraper responsible for spreading it).

In order to avoid these problems affecting the quality of the parts which are produced, it is necessary to be able to check the quality of the layers of powder which are deposited in order to identify the possible presence of these defects before they are selectively consolidated.

Many methods have been developed for this purpose. Reference may, for example, be made to the patent applications EP3378039A1 and DE102018207405A1.

These methods usually use specialized equipment such as industrial cameras, infrared imaging devices, and also specific lighting.

They are, therefore, costly.

They are, furthermore, generally based on a posteriori analyses and on complex algorithms such as 3D image reconstruction methods for comparing the various heights, and statistical modelling of lighting defects, etc., for example for comparing the various heights of powder in the same layer of powder.

They thus essentially have to do with laboratory methodology and are difficult to integrate into a manufacturing process and selective additive manufacturing machines intended for industrial use.

SUMMARY OF THE INVENTION

One aim of the invention is to propose a method for detecting defects in a layer of additive manufacturing powder which may be implemented with simple equipment and without major modifications to powder bed fusion printing machines.

Another aim of the invention is also to make it possible to use such a method during the printing process between each coating and fusion step, by making it economical in computing resources terms (execution time, memory required, etc.).

According to a first aspect, the present invention relates to a method for detecting defects in a layer of additive manufacturing powder deposited on a work zone, comprising steps of:
i. acquiring an image of a layer of additive manufacturing powder,
ii. determining a discrete spectral representation of the image acquired,
iii. a filter having at least one cutoff frequency filtering the discrete spectral representation of the image acquired in frequency terms,
iv. determining a filtered image from the filtered discrete spectral representation of the image acquired,
v. analysing the filtered image so as to detect defects in the layer of powder deposited.

Step v. of analysing the filtered image may further comprise steps:
v.a) of enhancing the contrast of the filtered image,
v.b) of detecting edges and/or shapes in the contrast-enhanced filtered image,
v.c) of processing the edges and/or the shapes detected so as to classify types of defects associated with the edges and/or with the shapes detected, and
v.d) of calculating a score associated with a layer of additive manufacturing powder deposited, said score characterizing the number and/or the size of defects which are present in the layer.

The frequency filter applied in step iii. may be a Gaussian band-pass filter.

According to a second aspect, the present invention relates to a method for detecting defects in a layer of additive manufacturing powder implementing a machine learning model which is configured to detect defects in the additive manufacturing layer, in which the training of the model comprises implementing a method according to the first aspect.

According to a third aspect, the present invention relates to a method for selectively additively manufacturing a three-dimensional object from layers of powder, the method comprising a device for selectively additively manufacturing a three-dimensional object from layers of powder implementing the steps of:
A. applying a layer of additive manufacturing powder to a base or to a previously consolidated layer,
B. detecting defects in the layer of additive manufacturing powder deposited according to the first aspect before it being consolidated,
C. emitting a laser beam onto a first point of the layer of additive manufacturing powder, so as to consolidate a first zone of the layer of powder comprising the first point,
which are repeated for a determined number of iterations, the step of detecting defects in the layer of additive manufacturing powder which is deposited on a work zone further comprises processing means (21, 31) implementing sub-steps of:
B.i. acquiring an image of the layer of additive manufacturing powder,
B.ii. determining a discrete spectral representation of the image acquired,
B.iii. filtering the discrete spectral representation of the image acquired in frequency terms, B.iv. determining a filtered image from the filtered discrete spectral representation of the image acquired, B.v. analysing the filtered image so as to detect defects in the layer of powder deposited.

BRIEF DESCRIPTION OF THE FIGURES

Other features and advantages of the present invention will become apparent from reading the following description of a preferable embodiment. This description will be given with reference to the appended drawings, in which.

DETAILED DESCRIPTION

Architecture

Figure 1:
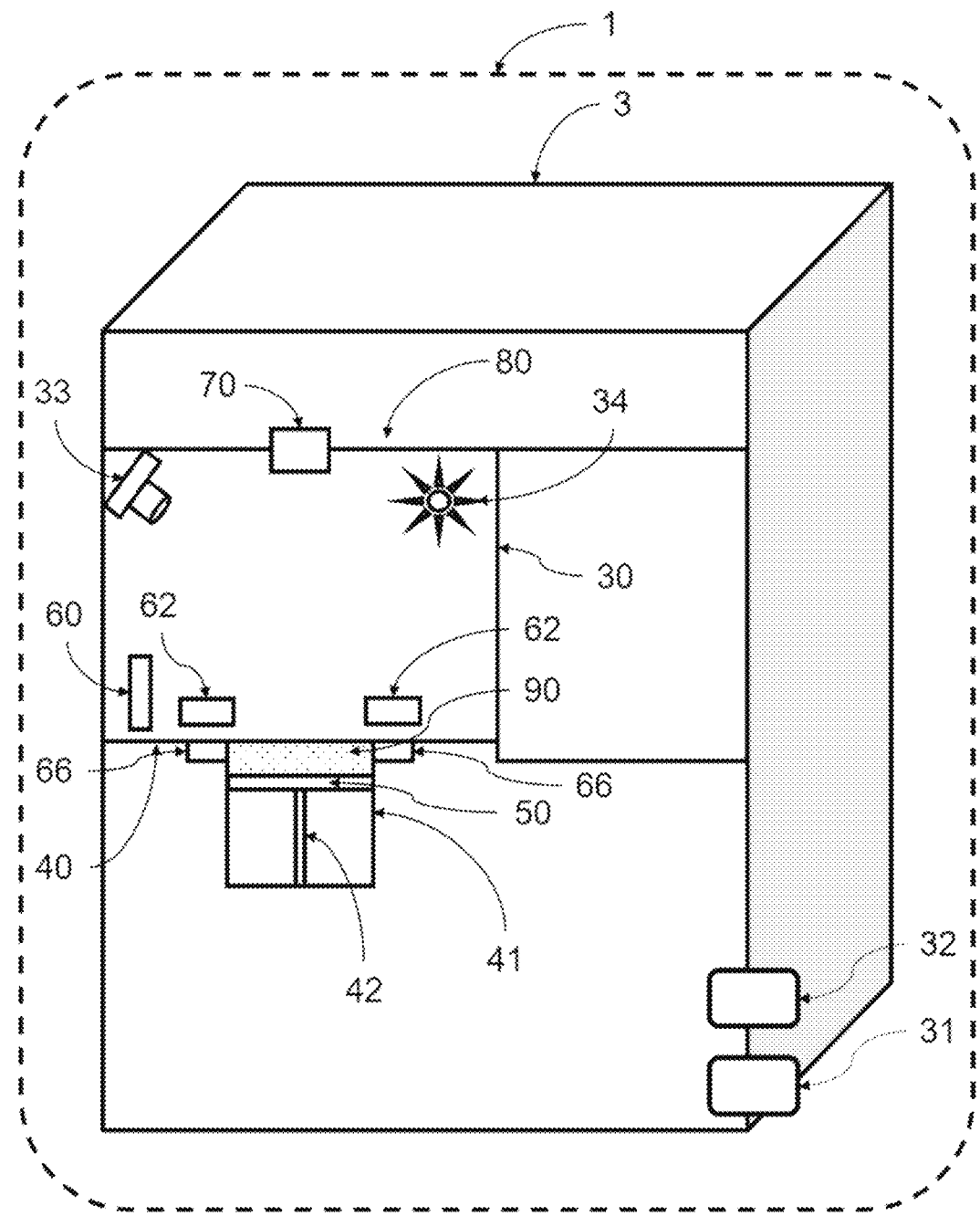
FIG. 1 is a diagram of an architecture for implementing the method according to the invention.

The selective additive manufacturing device 1 of FIG. 1 comprises:

an additive manufacturing unit 3;

data processing means 31 of processor type which are configured to implement a defect detection method according to the invention, and data storage means 32 such as a computer memory, for example a hard disk, on which are stored code instructions for executing a defect detection method according to the invention.

The additive manufacturing unit 3 is a machine for selective additive manufacturing using layers of powder of the type currently marketed by the company AddUp®. Such a machine conventionally has a manufacturing chamber 80 comprising an enclosure 30 and a work surface 40. The enclosure 30 comprises side walls and a top cover, and covers the work surface 40. The enclosure may, for example, be made of metal or of ceramic.

The manufacturing chamber 80 also has a manufacturing plate 50 intended to receive the additive manufacturing powder 90 in the form of successive layers and to support a part while it is being manufactured. To this end, the plate 50 preferably has mechanical strength characteristics making it possible to support a part weighing several tens of kilograms or even a hundred kilograms. Thus, the platform 50 may, for example, be made of metal.

According to the embodiment presented here, the plate 50 slides through an opening in the work surface 40 into a sleeve 41 located under the work surface 40. The work surface 40 surrounds the topedge of the manufacturing sleeve, and the manufacturing sleeve makes it possible to keep a manufactured part and the non-solidified powder which surrounds it on the plate 50 in a substantially closed volume. However, according to another embodiment, the plate 50 could, for example, be juxtaposed with the work surface 40.

The plate 50 is located in the plane of the work surface 40 at the start of the manufacturing cycle, then in a plane which is substantially parallel to the plane of the work surface 40 as the plate descends into the sleeve.

The manufacturing plate 50 may be circular, rectangular, square, triangular, etc. in shape. Furthermore, the manufacturing chamber 80 comprises a carriage 60 sliding above the work surface 40 and the plate 50.

The carriage 60 makes it possible to distribute the powder on the plate 50, or on a preceding layer of powder, with a view to manufacturing a part, the powder being able to be distributed on either side of the work zone by metering devices 62 delivering powder to a slide 66 which moves in translation under the metering device so as to obtain a line of powder in front of the work zone. The carriage 60 may, for example, comprise a scraper and/or a roller.

In addition, the manufacturing chamber 80 comprises a power supply member 70 which makes it possible to melt a metal powder. The power supply member 70 may, for example, be a laser beam source, an electron beam source, etc.

Furthermore, the manufacturing chamber 80 comprises lighting means 34 such as a lamp or a photographic flash, and also imaging means 33 such as a photographic sensor. It is also possible to integrate the lighting means 34 and imaging means 33 outside the manufacturing chamber, behind openings closed by panes of glass.

Figure 2:
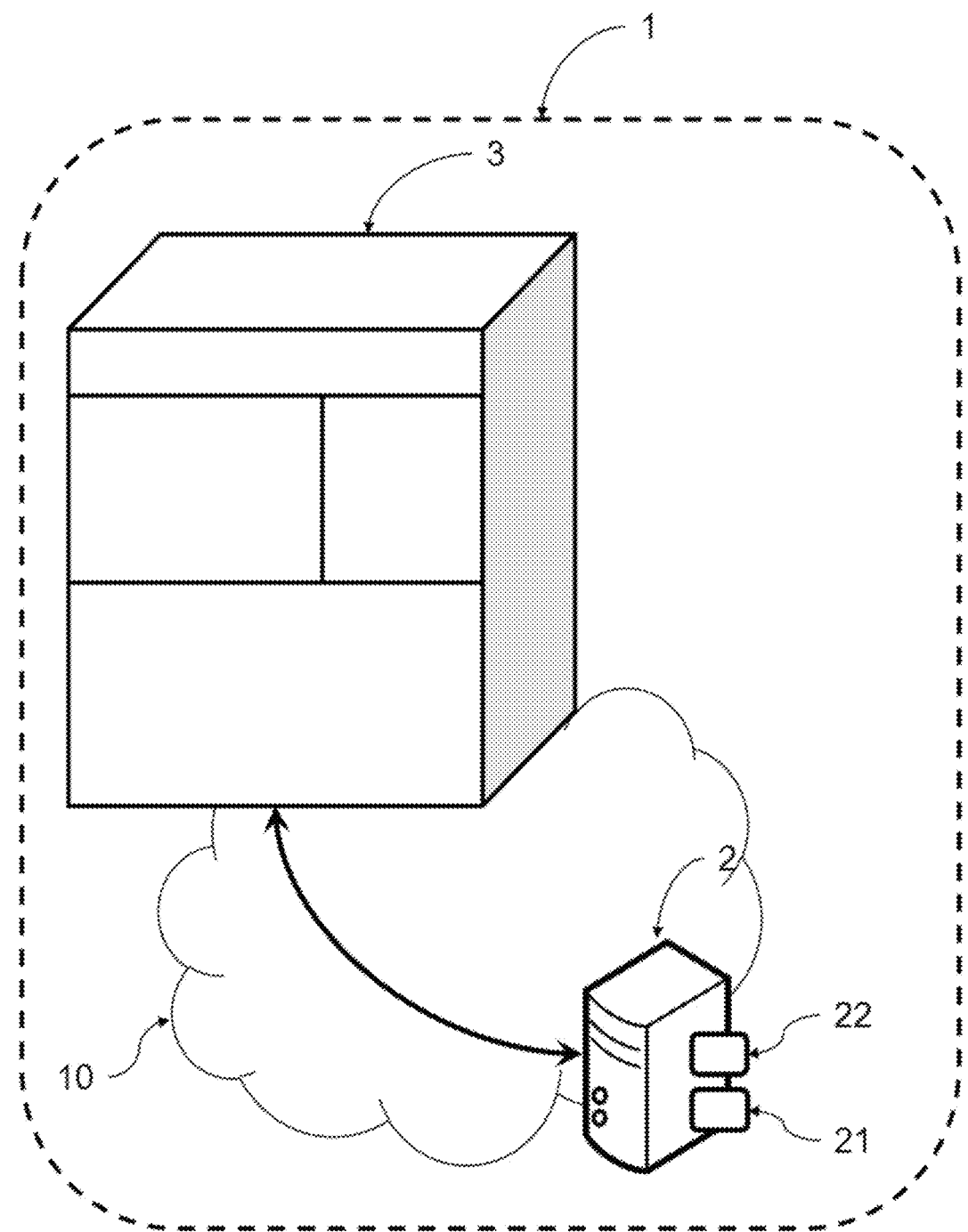
FIG. 2 is a diagram of an alternative architecture for implementing the method according to the invention.

It will be noted that, as a variant, these processing and storage means may be transferred to a remote server 2. This is what is illustrated in FIG. 2, in which the unit 3 has been shown connected to a server 2 by a data exchange network 10, the server 2 comprising:

data processing means 21 of processor type which are configured to implement a defect detection method according to the invention, and data storage means 22 such as a computer memory, for example a hard disk, on which are stored code instructions for executing a defect detection method according to the invention.

The data processing means 21 or 31 are configured to implement a manufacturing method which will be described hereinbelow.

Additive Manufacturing Method

Figure 3:
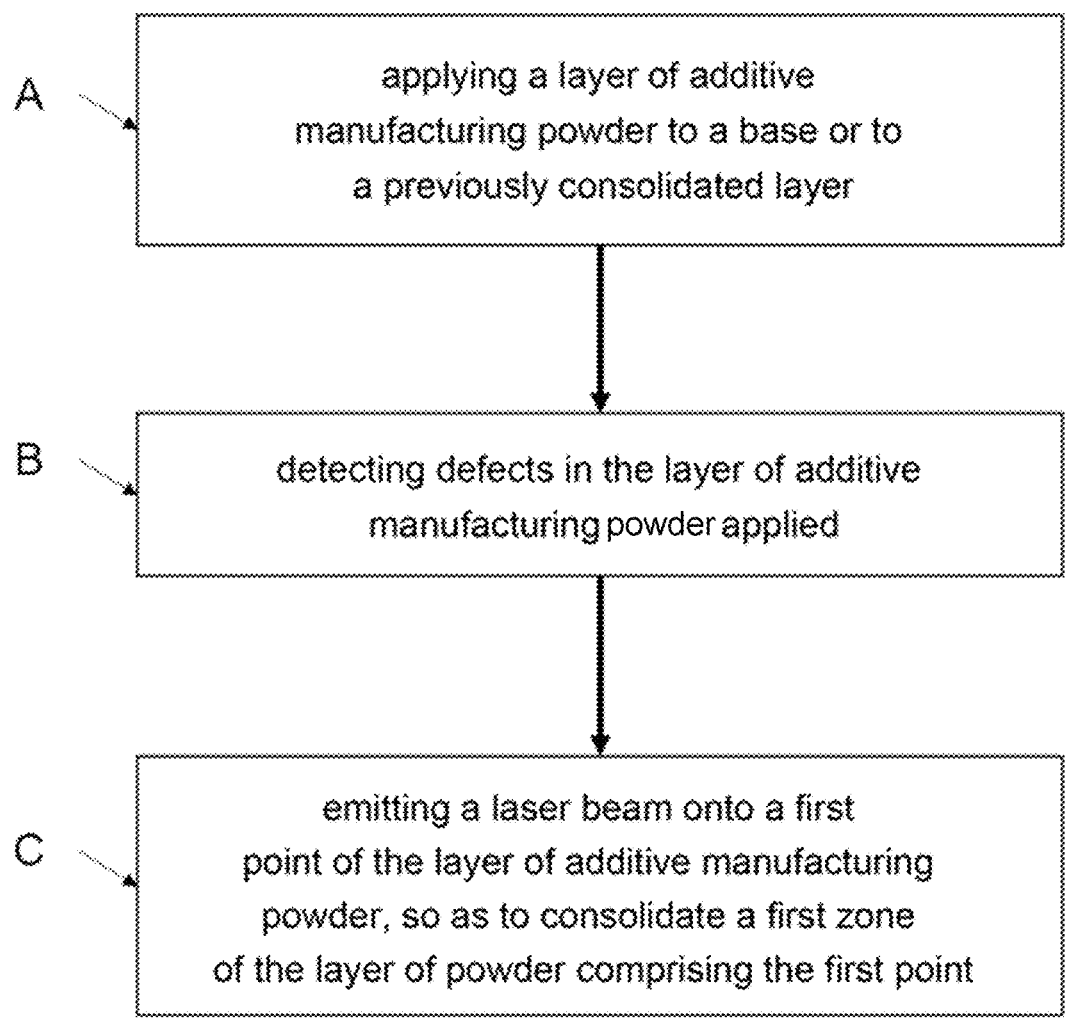
FIG. 3 shows the steps of a method for selectively additively manufacturing a three-dimensional object from layers of powder according to the invention.

A manufacturing method described in relation to FIG. 3 comprises a first step A, referred to as "coating", during which a layer of additive manufacturing powder is deposited, by virtue of the carriage 60, on the plate 50.

Following this first step, the quality of the layer of additive manufacturing powder is evaluated in a step B of detecting defects in the layer of additive manufacturing powder deposited. It is during this step that defects such as untimely deposits or lack of powder can be detected.

Depending on the quality of the layer of additive manufacturing powder evaluated during the defect detection step (step B), it is possible to decide to repeat the coating step (step A) in order to eliminate defects which might have appeared. Furthermore, it is also possible, in the event of defects being detected repeatedly, or indeed if these defects are too numerous in a layer, to warn the operators of the device for selectively additively manufacturing a three-dimensional object from layers of powder in order to make it possible for them to evaluate the seriousness of the defects, to diagnose the origin of the defects and also to decide on continuing the manufacturing process (step F, which will be described hereinbelow).

Finally, a third, fusion step (step C), once the quality of the layer of additive manufacturing powder has been evaluated to be sufficient, consists in emitting a laser beam onto the zones of the layer of powder to be consolidated in order to form the part.

Defect Detection (Step B)

Figure 4:
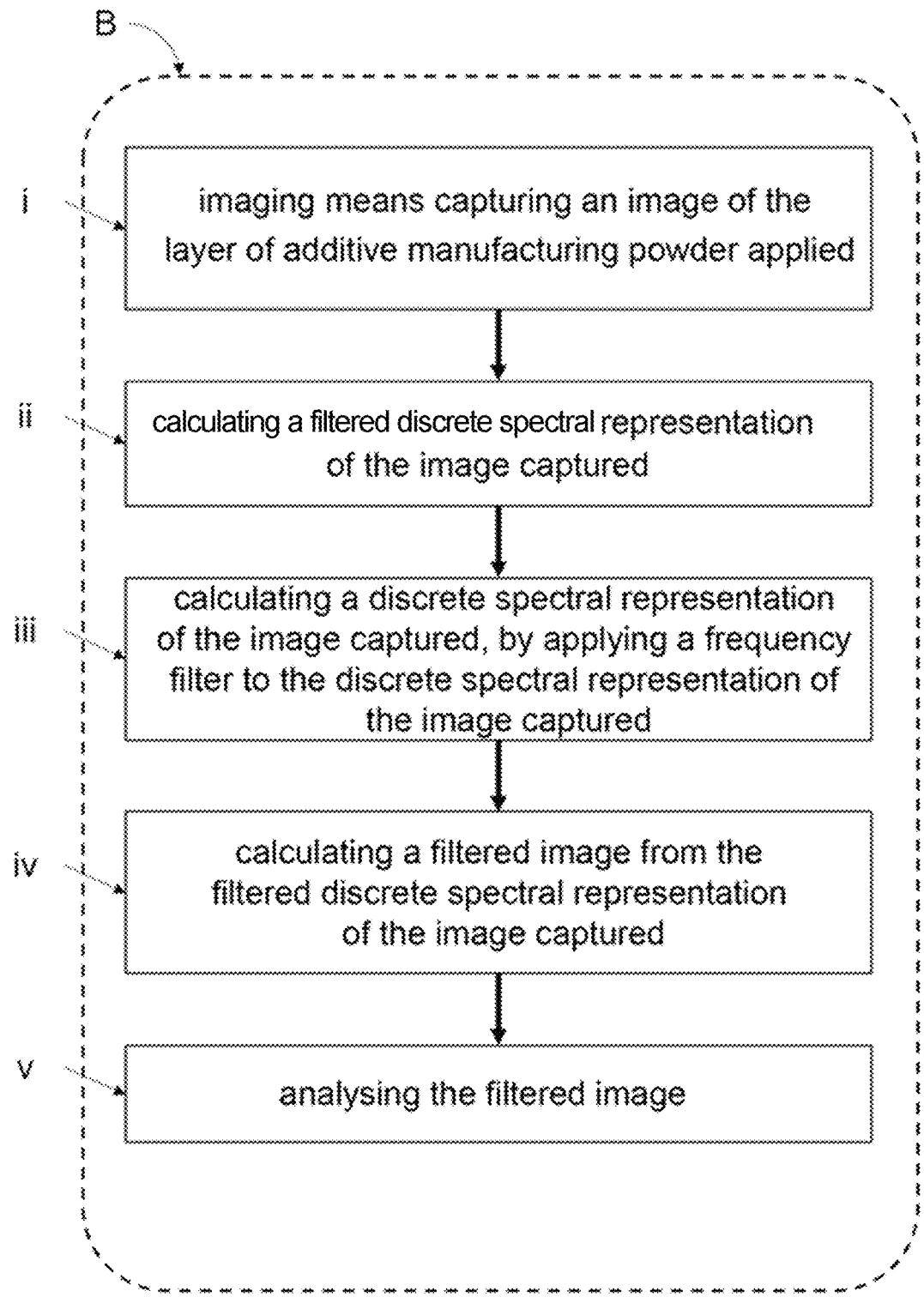
FIG. 4 shows the steps of a method for detecting defects in a layer of additive manufacturing powder according to the invention.
Figure 5:
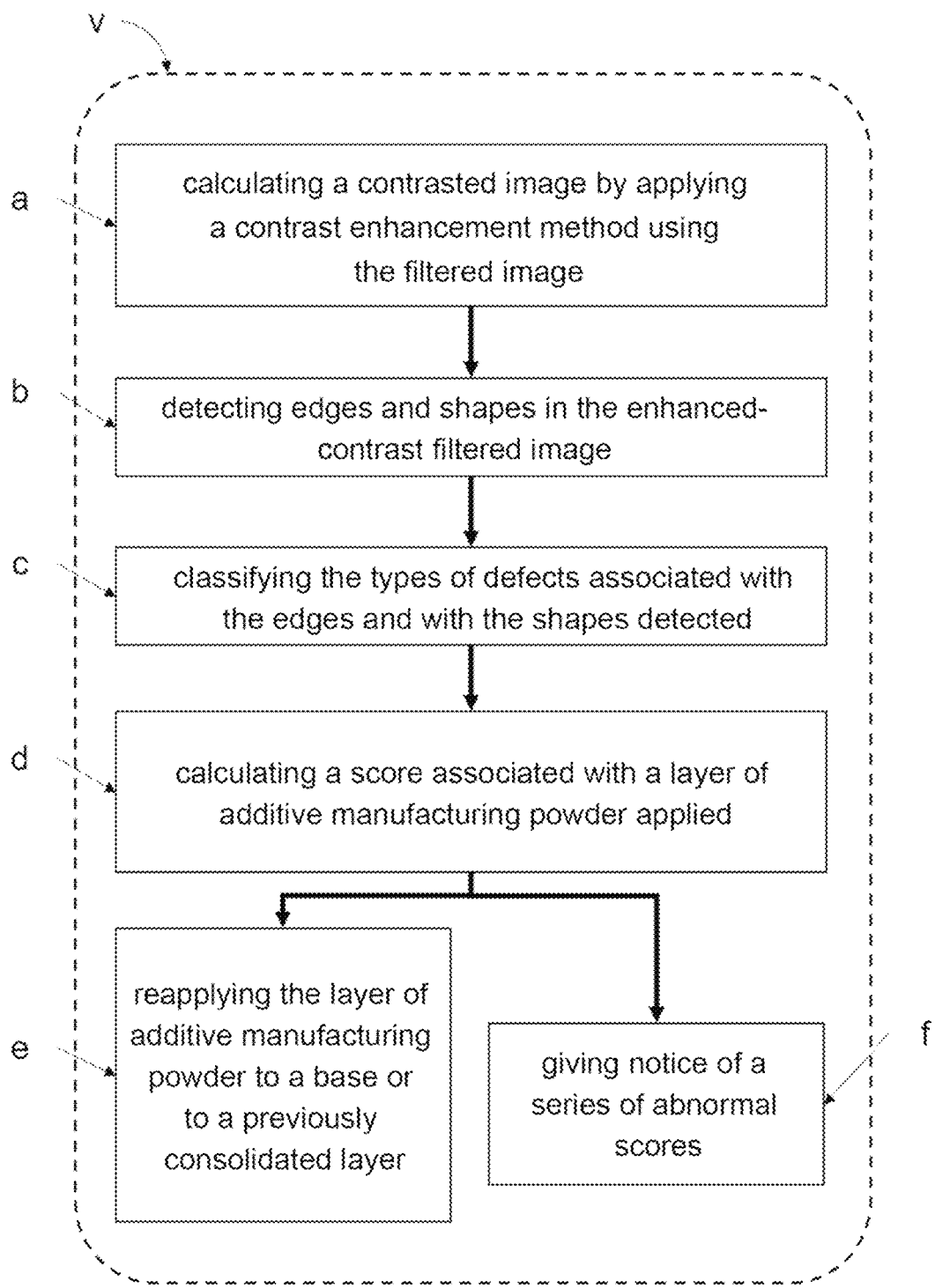
FIG. 5 shows the steps of a filtered image analysis method according to the invention.

The coating defect detection step as described in FIG. 4 takes place between the coating step, A, and the fusion step, C, and makes it possible to ensure that the fusion step, C, will not be performed on a layer of powder having defects. The presence of defects in the layer of powder can lead to a defective part being manufactured. This defect detection is particularly crucial in the field of additive manufacturing from layers of powder because manufacturing times may be particularly long and it is therefore important to detect potential defects as quickly as possible, either in order to remedy them, or in order to end the manufacturing process as soon as possible if these defects cannot be corrected in order to avoid wasting manufacturing time.

In order to implement the detection step, B, the additive manufacturing device 1 simply needs to be equipped with conventional imaging means and with directional lighting means. It is therefore not necessary to use very high-frequency industrial cameras or cameras adapted to electromagnetic radiation other than the visible spectrum.

Furthermore, the proposed detection step, B, advantageously comprises sub-steps making it possible to suppress the light halo effects generated by monodirectional lighting devices and thus avoid having to equip the additive manufacturing device 1 with a omnidirectional lighting device, which is much more complicated to integrate.

For this, the defect detection step, B, comprises a sub-step i) of imaging means acquiring an image of the layer of additive manufacturing powder deposited.

Next, a discrete spectral representation of the image acquired is calculated during a sub-step ii) by a Discrete Fourier Transform (DFT) method. A frequency filter is next applied to this discrete spectral representation of the image acquired in a sub-step iii). The frequency filter applied may more particularly be a Gaussian band-pass filter, this type of filter making it possible both to suppress the halo effect and to suppress the noise which is present in the image acquired, unlike a simple high-pass filter, which would remove only the halo. After this, the filtered image is reconstructed from the filtered spectrum by an inverse Discrete Fourier Transform (inverse DFT) method in a sub-step iv).

Finally, the filtered image is analysed in a sub-step v), in order to detect and evaluate potential coating defects. The analysis sub-step comprises an operation a) of contrast optimization in order to generate a contrasted image using a local contrast enhancement method, for example by the Contrast-Limited Adaptive Histogram Equalization (CLAHE) technique. Following this, a edge detection or region detection (blob detection) method is carried out in an operation b); such a method may be, for example, a difference of Gaussians in order to extract variations in the texture of the layer of additive manufacturing powder corresponding to coating defects. A defect classification operation c) is then carried out in order to classify the defects, with "untimely deposits", "lack of powder" and "roller defects", for example, as classes. Then, a score may be calculated for the whole image, depending on the defects detected, during an operation d). This score is calculated according to the geometric properties of all the edges detected in the image, as well as their distribution. More particularly, the score may, for example, be calculated according to the total area of the edges which are detected, the area of the largest edge or edges which are detected, the number of edges which are detected having an area which is above a threshold, the number of edges which are detected, the proportion of the image occupied by defects (ratio of the total area of the edges which are detected to the total area of the image), their distance from the zone where the part is manufactured, and their connectedness (in the topological sense). In one preferred embodiment, all of these parameters are combined according to a linear combination in order to obtain a score depending on several parameters. It is also possible to use artificial learning methods to calculate a score associated with the layer of powder directly.

Finally, the score associated with the layer is compared with various thresholds. In a first operation, e), the score is compared with a first threshold in order to evaluate whether it is necessary, for the additive manufacturing device, to reapply the layer of additive manufacturing powder to a base or to a previously consolidated layer before proceeding to the following step of the manufacturing method (step B). It is also possible to use a counter, updated each time the score exceeds a second threshold (which may be different from the first one or identical), in an operation f), in order to decide whether it is necessary to notify the operator of the manufacturing device 1 of too large a number of defects in the layer of additive manufacturing powder, in other words to notify the operator when the number of defects which are counted exceeds a number of predefined defects, in order, for example, to make it possible for him/her to end the manufacturing process and/or to diagnose the source of possible defects.

Machine Learning Model

It is also possible to use a machine learning model such as a support vector machine (SVM), random forest classifiers, or a neural network in order to detect defects in the layer of powder. It is then possible to use the fault detection step in order to generate a training dataset for training the machine learning model. Thus, the score and/or the decision to reapply the layer of additive manufacturing powder before proceeding to the next step of the manufacturing method is stored in a training database as is the image from which this score was calculated and/or on the basis of which the decision was taken. This database may thus be used in the context of training a machine learning model, notably for binary classification tasks (determining whether the layer has indeed been applied or not), or else multi-class or multi-label classification tasks (for example, giving an assessment of the quality of the coating), or else ranking tasks using a numerical evaluation which is similar to the score making it possible to classify a set of coating images from best (in terms of defects) to worst.

The invention claimed is:

1. A method for detecting defects in a layer of additive manufacturing powder deposited on a work zone, the method comprising, before selectively consolidating the layer of additive manufacturing powder, implementing the following steps using a processing means:
   (i) acquiring an image of the layer of additive manufacturing powder deposited;
   (ii) determining a discrete spectral representation of the image acquired;
   (iii) filtering the discrete spectral representation of the image acquired in frequency terms using a filter having at least one cutoff frequency;
   (iv) determining a filtered image from the filtered discrete spectral representation of the image acquired; and
   (v) analyzing the filtered image so as to detect defects in the layer of additive manufacturing powder deposited.

2. The method for detecting defects in a layer of additive manufacturing powder according to claim 1, wherein step (v) comprises the steps of:

(v.a) enhancing contrast of the filtered image;
(v.b) detecting edges and/or shapes in the contrast-enhanced filtered image; and
(v.c) processing the edges and/or shapes detected so as to classify types of defects associated with the edges and/or shapes detected.

3. The method for detecting defects in a layer of additive manufacturing powder according to claim 1, wherein the filter applied in step (iii) is a band-pass filter.

4. The method for detecting defects in a layer of additive manufacturing powder according to claim 2, further comprising:
(v.d) calculating a score associated with a layer of additive manufacturing powder deposited, the score characterizing a number and/or a size of defects which are present in the layer.

5. The method for detecting defects in a layer of additive manufacturing powder according to claim 1, wherein the processing means implements a machine learning model configured to detect defects in the additive manufacturing layer, and wherein training the model comprises implementing the method for detecting defects in a layer of additive manufacturing powder.

6. A method for selectively additively manufacturing a three-dimensional object from layers of powder, the method comprising implementing the following steps using a device for selectively additively manufacturing a three-dimensional object from layers of powder (1):
(A) applying a layer of additive manufacturing powder to a base or to a previously consolidated layer;
(B) detecting defects in the layer of additive manufacturing powder deposited before it is consolidated; and
(C) emitting a laser beam onto a first point of the layer of additive manufacturing powder, so as to consolidate a first zone of the layer of powder comprising the first point,
wherein steps (A) through (C) are repeated for a determined number of iterations, and
wherein step (B) comprises implementing the following sub-steps using a processing means:
(B.i) acquiring an image of the layer of additive manufacturing powder;
(B.ii) determining a discrete spectral representation of the image acquired;
(B.iii) filtering the discrete spectral representation of the image acquired in frequency terms;
(B.iv) determining a filtered image from the filtered discrete spectral representation of the image acquired; and
(B.v) analyzing the filtered image so as to detect defects in the layer of additive manufacturing powder deposited.

7. The method for selectively additively manufacturing a three-dimensional object from layers of powder according to claim 6, wherein sub-step (B.v) comprises the steps of:
(B.v.a) enhancing the contrast of the filtered image;
(B.v.b) detecting edges and/or shapes in the contrast-enhanced filtered image; and
(B.v.c) processing the edges and/or shapes detected so as to classify types of defects associated with the edges and/or shapes detected.

8. The method for selectively additively manufacturing a three-dimensional object from layers of powder according to claim 7, wherein sub-step (B.v) further comprises:
(B.v.d) calculating a score associated with a layer of additive manufacturing powder deposited.

9. The method for selectively additively manufacturing a three-dimensional object from layers of powder according to claim 8, wherein, when the score calculated during step (B.v.d) is above a first threshold, the method further comprises the step:
(B.v.e) selectively reapplying the layer of additive manufacturing powder to the base or to the previously consolidated layer.

10. The method for selectively additively manufacturing a three-dimensional object from layers of powder according to claim 8, wherein, when the score calculated during step (B.v.d) is above a second threshold, a counter of the number of defects is updated, and the method further comprises the step:
(B.v.f) giving notice of an abnormal score when the number of defects which are counted exceeds a predefined number of defects.

11. An additive manufacturing device comprising:
a plate to which an additive manufacturing powder is applied;
a carriage adapted to deposit the additive manufacturing powder in the form of a layer of additive manufacturing powder;
lighting means and imaging means adapted to acquire an image of the layer of additive manufacturing powder deposited; and
data processing means and data storage means on which are stored code instructions for the data processing means to execute the method for selectively additively manufacturing a three-dimensional object from layers of powder according to claim 6.

* * * * *